(12) United States Patent
Yamazaki et al.

(10) Patent No.: US 9,035,860 B2
(45) Date of Patent: May 19, 2015

(54) DISPLAY DEVICE

(75) Inventors: Shunpei Yamazaki, Setagaya (JP); Jun Koyama, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 256 days.

(21) Appl. No.: 13/367,715

(22) Filed: Feb. 7, 2012

(65) Prior Publication Data

US 2012/0206446 A1 Aug. 16, 2012

(30) Foreign Application Priority Data

Feb. 16, 2011 (JP) ................................. 2011-031154

(51) Int. Cl.
*G06T 15/00* (2011.01)
*H04N 13/04* (2006.01)
*G02B 27/22* (2006.01)

(52) U.S. Cl.
CPC ....... *H04N 13/0468* (2013.01); *H04N 13/0409* (2013.01); *H04N 13/0413* (2013.01); *H04N 13/0422* (2013.01); *G02B 27/2214* (2013.01)

(58) Field of Classification Search
CPC .......... H04N 13/0409; H04N 13/0413; H04N 13/0422; H04N 13/0468; G02B 27/2214
USPC ............... 345/87, 697; 359/15, 462, 464, 466
See application file for complete search history.

(56) References Cited

U.S. PATENT DOCUMENTS 6,597,348 B1  7/2003  Yamazaki et al.
6,882,012 B2  4/2005  Yamazaki et al.
6,970,290 B1 * 11/2005 Mashitani et al. ............ 359/462
7,145,536 B1  12/2006 Yamazaki et al.
7,193,593 B2  3/2007  Koyama et al.

(Continued)

FOREIGN PATENT DOCUMENTS

JP  03-119889  5/1991
JP  08-036145  2/1996

(Continued)

OTHER PUBLICATIONS

Kamiya et al., "Carrier transport properties and electronic structures of amorphous oxide semiconductors: the present status," Solid State Physics, Sep. 1, 2009, vol. 44, No. 9, pp. 621-633, Agne Gijutsu Center.

*Primary Examiner* — Amare Mengistu
*Assistant Examiner* — Jennifer Zubajlo
(74) *Attorney, Agent, or Firm* — Eric J. Robinson; Robinson Intellectual Property Law Office, P.C.

(57) ABSTRACT

A display device includes a display panel including a matrix of pixel regions, and a shutter panel including a matrix of optical shutter regions each of which state is selected from a light-transmitting state and a light-shielding state. In a first display state, the display panel performs display regarding one pixel region as a display element unit, and each of the plurality of optical shutter regions in the shutter panel is brought into a light-transmitting state or a light-shielding state. In a second display state, the display panel performs display regarding at least two pixel regions as the display element unit, and each of the plurality of optical shutter regions in the shutter panel is brought into a light-transmitting state or a light-shielding state. As a result, the range of distance with which 3D images can be displayed can differ between the first display state and the second display state.

14 Claims, 10 Drawing Sheets

(56) References Cited

U.S. PATENT DOCUMENTS

| | | |
|---|---|---|
| 7,224,339 B2 | 5/2007 | Koyama et al. |
| 7,268,756 B2 | 9/2007 | Koyama et al. |
| 7,317,438 B2 | 1/2008 | Yamazaki et al. |
| 7,385,579 B2 | 6/2008 | Satake |
| 7,425,937 B2 | 9/2008 | Inukai |
| 7,791,571 B2 | 9/2010 | Ohtani et al. |
| 2005/0001787 A1* | 1/2005 | Montgomery et al. ........... 345/6 |
| 2005/0012097 A1 | 1/2005 | Yamazaki |
| 2006/0126177 A1* | 6/2006 | Kim et al. ..................... 359/465 |
| 2007/0279359 A1 | 12/2007 | Yoshida et al. |
| 2007/0279374 A1 | 12/2007 | Kimura et al. |
| 2009/0321737 A1 | 12/2009 | Isa et al. |
| 2010/0148177 A1 | 6/2010 | Koyama et al. |
| 2010/0182282 A1 | 7/2010 | Kurokawa et al. |
| 2011/0051239 A1 | 3/2011 | Daiku |
| 2011/0157696 A1 | 6/2011 | Bennett et al. |
| 2012/0154696 A1 | 6/2012 | Koyama |
| 2012/0206325 A1 | 8/2012 | Yamazaki et al. |
| 2012/0206503 A1 | 8/2012 | Hirakata et al. |
| 2012/0218325 A1* | 8/2012 | Hiroki et al. .................. 345/697 |

FOREIGN PATENT DOCUMENTS

| | | | |
|---|---|---|---|
| JP | 2003-259395 | | 9/2003 |
| JP | 2005-092103 | | 4/2005 |
| JP | 2005092103 A | * | 4/2005 |
| JP | 2005-258013 | | 9/2005 |

* cited by examiner

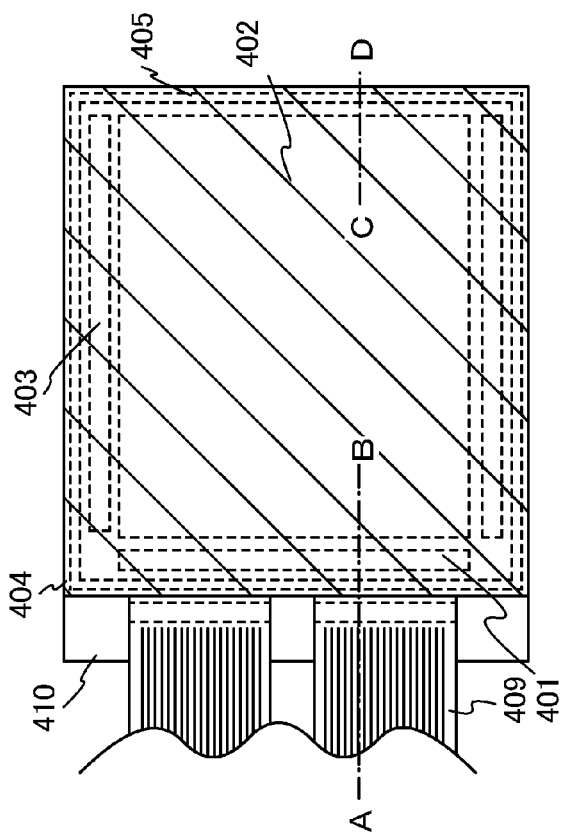
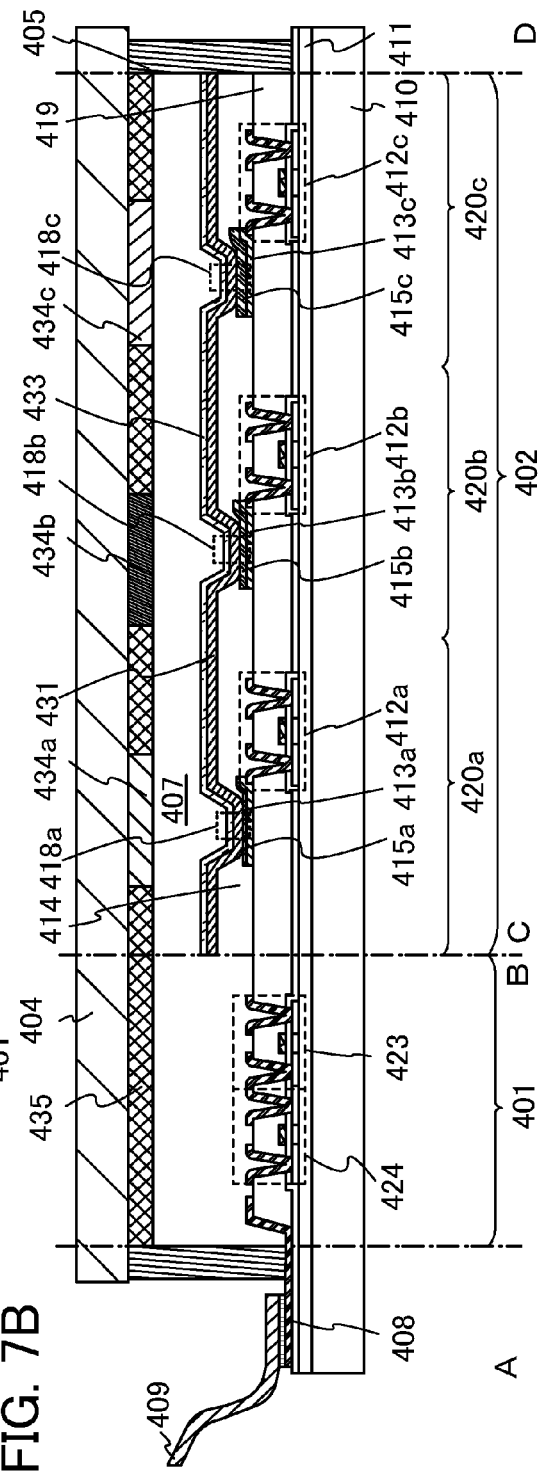
FIG. 7A
FIG. 7B

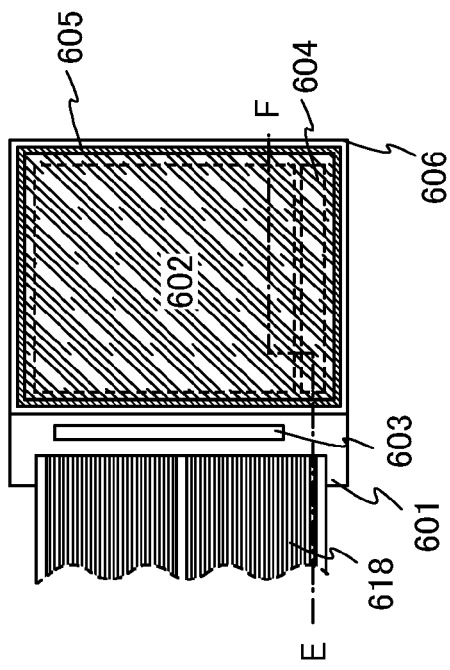
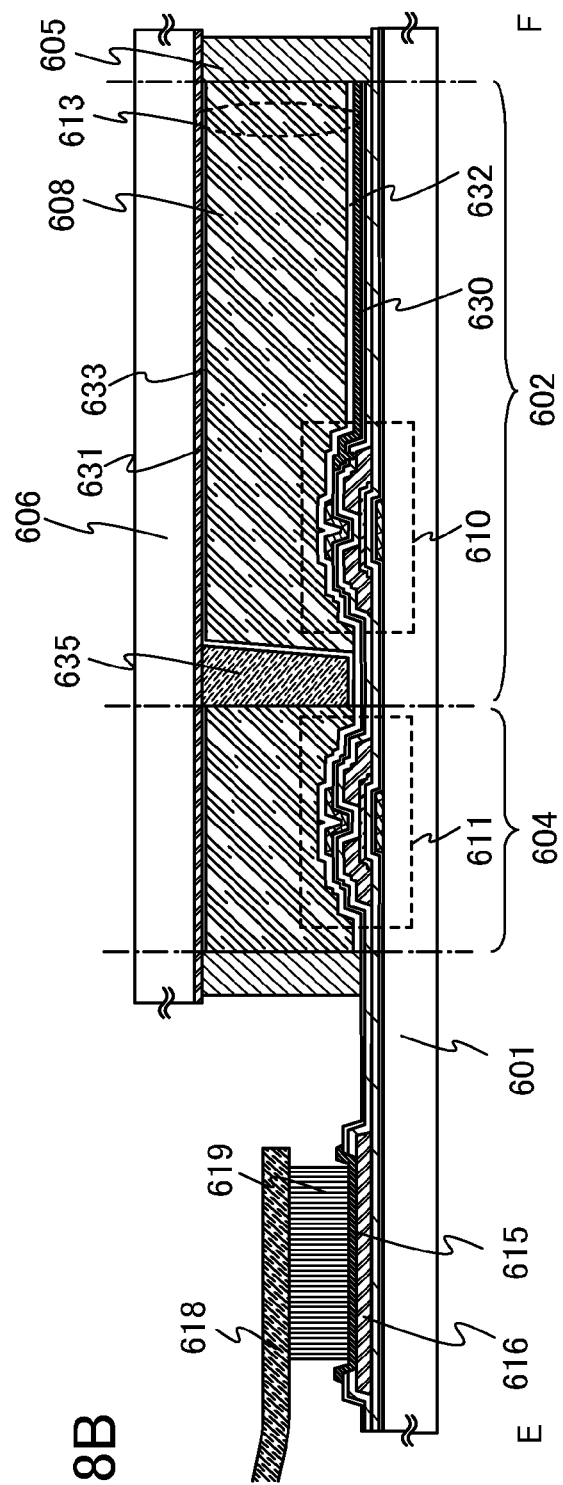
FIG. 8A
FIG. 8B

DISPLAY DEVICE

BACKGROUND OF THE INVENTION

1. Field of the Invention

The present invention relates to display devices and particularly relates to a display device capable of displaying three-dimensional (3D) images.

2. Description of the Related Art

Display devices are widely used, ranging from large display devices such as television devices to small display devices such as mobile phones. High value-added products will be needed and are being developed. In recent years, display devices that can display 3D images have been developed in order to display more realistic images.

As methods for displaying 3D images, there are a method using glasses for separating an image seen with a left eye and an image seen with a right eye (also referred to as stereoscopy), and autostereoscopy by which 3D images can be seen by the naked eye by addition of a structure for separating an image seen with a left eye and an image seen with a right eye in a display portion. It is not necessary to prepare glasses to see autostereoscopic 3D images, which offers a high convenience. Autostereoscopic 3D display is coming into widespread use such as mobile phones and mobile game consoles.

As a method for displaying autostereoscopic 3D images, there is known a parallax barrier method in which a parallax barrier is added to a display portion. A parallax barrier for this method is a stripe-shaped light-shielding portion and causes a decrease in resolution when display is switched from 3D display to 2D display. In view of this, for a parallax barrier method, there is suggested a structure in which a liquid crystal panel having a patterned transparent electrode is used, and when display is switched between 2D display and 3D display, transmission or shielding of light by a liquid crystal layer is controlled by controlling voltage applied to the transparent electrode in order to set the presence or absence of a parallax barrier (see Patent Document 1).

REFERENCE

Patent Document 1: Japanese Published Patent Application No. 2005-258013

SUMMARY OF THE INVENTION

However, in order to display 3D images by a parallax barrier method, a specific distance is needed between a display screen and the eye of a viewer.

In view of the above, an object of one embodiment of the present invention is to increase the range of distance (between a display screen and the eye of a viewer) with which the viewer can see 3D images by the naked eye.

According to one embodiment of the present invention, a display device includes a display panel in which a plurality of pixel regions are arranged in matrix; and a shutter panel in which a plurality of optical shutter regions whose state is selected from a light-transmitting state and a light-shielding state are arranged in matrix. In a first display state, the display panel performs display regarding one pixel region as a display element unit, and each of the plurality of optical shutter regions in the shutter panel is brought into a light-transmitting state or a light-shielding state. In a second display state, the display panel performs display regarding at least two pixel regions as the display element unit, and each of the plurality of optical shutter regions in the shutter panel is brought into a light-transmitting state or a light-shielding state. States of the plurality of optical shutter regions in the first display state are different from those of the plurality of optical shutter regions in the second display state. The shutter panel is positioned in the direction of light emission from the display panel.

According to one embodiment of the present invention, in the above display device, the pixel region includes at least three sub-pixels, and at least one of the three sub-pixels expresses black in the second display state.

According to one embodiment of the present invention, the above display device includes a sensor configured to measure the distance between a viewer and the display device. Whether the optical shutter region is brought into a light-transmitting state or a light-shielding state is selected in accordance with the distance measured by the sensor.

According to one embodiment of the present invention, the range of distance with which a viewer can see 3D images by the naked eye can be increased. A highly convenient display device can be provided as a result.

BRIEF DESCRIPTION OF THE DRAWINGS

In the accompanying drawings:

FIGS. 7A and 7B illustrate one embodiment of a display panel;

FIGS. 8A and 8B illustrate one embodiment of a display panel;

DETAILED DESCRIPTION OF THE INVENTION

Figure 1:
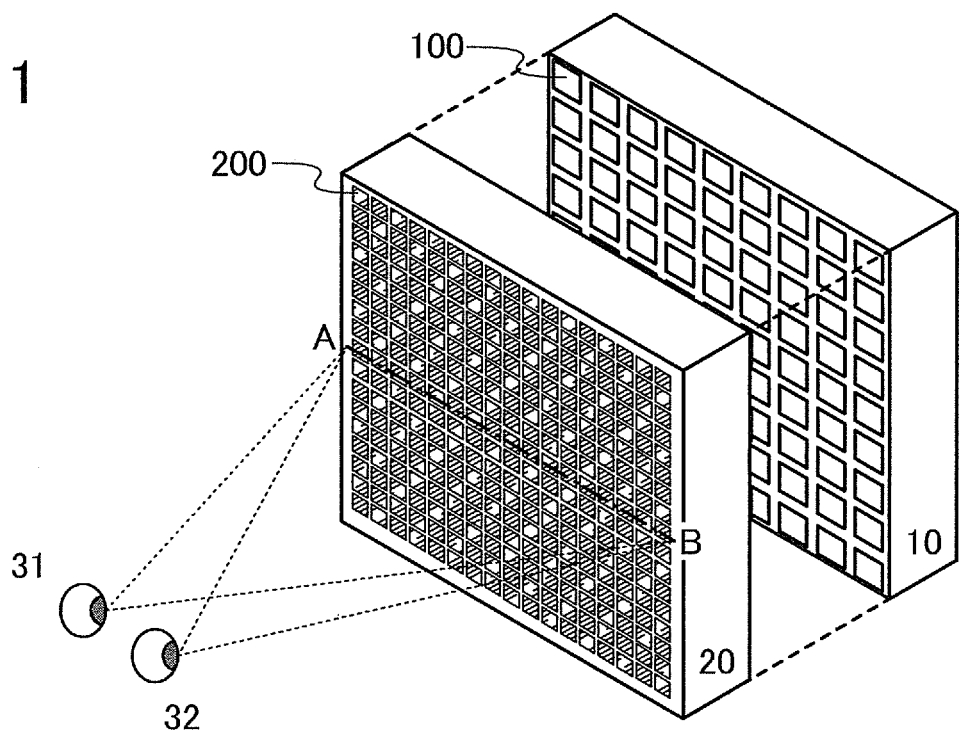
FIG. 1 is a schematic diagram of a display device.

Embodiments of the present invention will be hereinafter described with reference to the accompanying drawings. Note that the present invention can be carried out in many different modes, and it is easily understood by those skilled in the art that modes and details of the present invention can be modified in various ways without departing from the spirit and scope of the present invention. Therefore, the present invention should not be construed as being limited to the following description of the embodiments. Note that in structures of the present invention described below, reference numerals denoting the same portions are used in common in different drawings.

Note that the size, the thickness of a layer, signal waveform, and a region in structures illustrated in the drawings and the like in the embodiments are exaggerated for simplicity in some cases. Therefore, the scale is not necessarily limited to that illustrated in the drawings and the like.

Note that in this specification and the like, the terms "first", "second", "third", and "N-th" (N is a natural number) are used in order to avoid confusion between components and thus do not limit the number of the components. The natural number is 1 or more unless otherwise specified.

Embodiment 1

First, a display device according to one embodiment of the present invention will be described with reference to FIG. 1, FIGS. 2A and 2B, FIGS. 3A to 3C, and FIGS. 4A and 4B.

FIG. 1 is a schematic diagram of a display device according to one embodiment of the present invention. The display device illustrated in FIG. 1 includes a display panel 10 in which a plurality of pixel regions 100 are arranged in matrix, and a shutter panel 20 in which a plurality of optical shutter regions 200 are arranged in matrix. The density of the plurality of optical shutter regions 200 is higher than that of the plurality of pixel regions 100. In other words, the number of the optical shutter regions 200 included in the shutter panel 20 is larger than that of the pixel regions 100 included in the display panel 10. FIG. 1 shows a left eye 31 and a right eye 32 of a viewer in order to show a state of the viewer's perception.

The shutter panel 20 is provided in the direction of light emission from the display panel 10, that is, on the side viewed by the viewer of the display device. In the shutter panel 20, the state of each of the plurality of optical shutter regions 200 is selected from a light-transmitting state and a light-shielding state. That is, display to be viewed by the viewer can be blocked in each of the plurality of optical shutter regions 200.

Figure 2A:
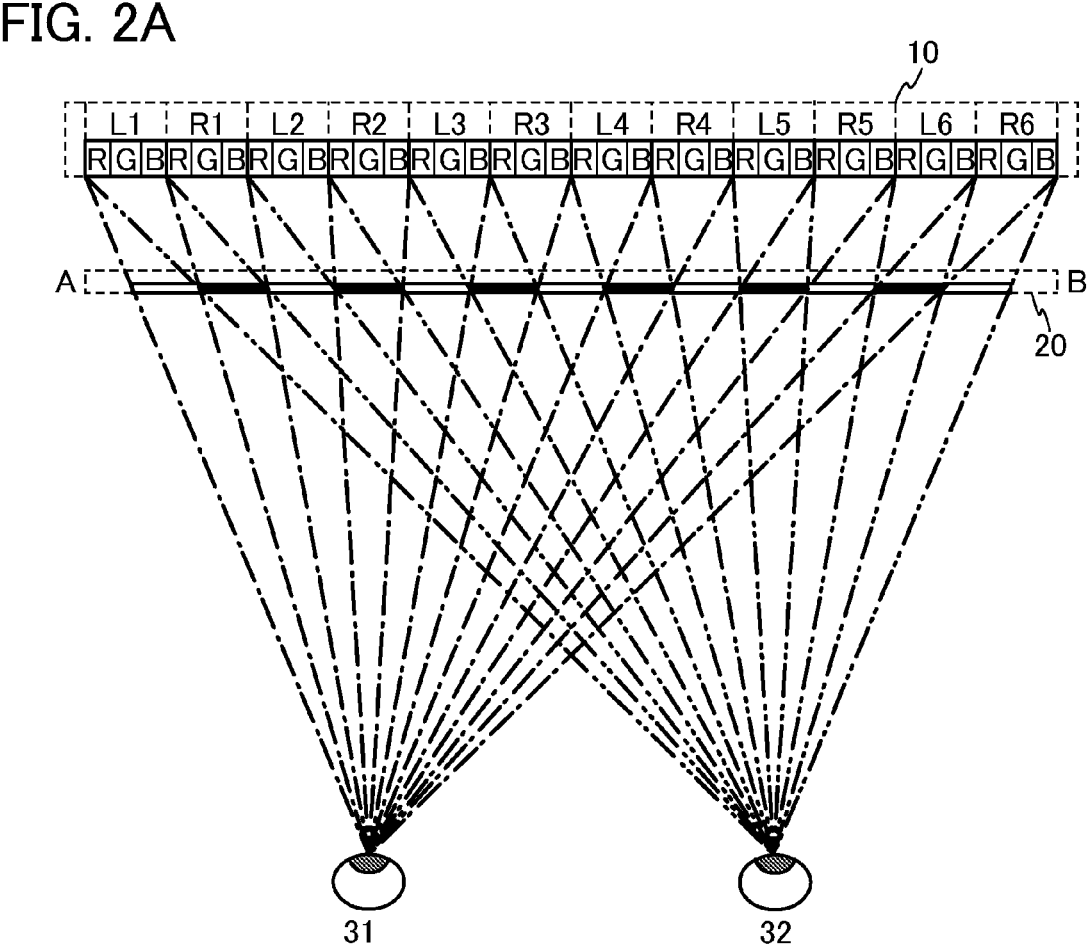
FIGS. 2A and 2B illustrate the relation between a light-shielding portion, a display panel, and a viewer.

FIG. 2A is a schematic diagram illustrating the structure of the display device in FIG. 1 along dashed line A-B. In the display panel 10 according to this embodiment, regarding one pixel region as a display element unit, right eye 3D displays (R1 to R6) can be performed in pixel regions adjacent to pixel regions where left eye 3D displays (L1 to L6) are performed. Each of the pixel regions where the right eye 3D display (R1 to R6) or the left eye 3D display (L1 to L6) is performed includes a sub-pixel (R) for expressing red, a sub-pixel (G) for expressing green, and a sub-pixel (B) for expressing blue. In addition, the shutter panel 20 according to this embodiment can be controlled so that the left eye 31 perceives only the pixel regions where the left eye 3D displays (L1 to L6) are performed, and the right eye 32 perceives only the pixel regions where the right eye 3D displays (R1 to R6) are performed. Specifically, optical shutter regions positioned between the left eye 31 and the pixel regions where the right eye 3D displays (R1 to R6) are performed and optical shutter regions positioned between the right eye 32 and the pixel regions where the left eye 3D displays (L1 to L6) are performed are brought into a light-shielding state (black portions in FIG. 2A), and the other regions are brought into a light-transmitting state.

In the above manner, 3D images can be displayed in the display device according to one embodiment of the present invention.

Further, in the display device according to this embodiment, 3D images can be viewed by the viewer even with the condition in which the distance between the viewer and the display device is different from that in the condition shown in FIG. 2A.

Figure 2B:
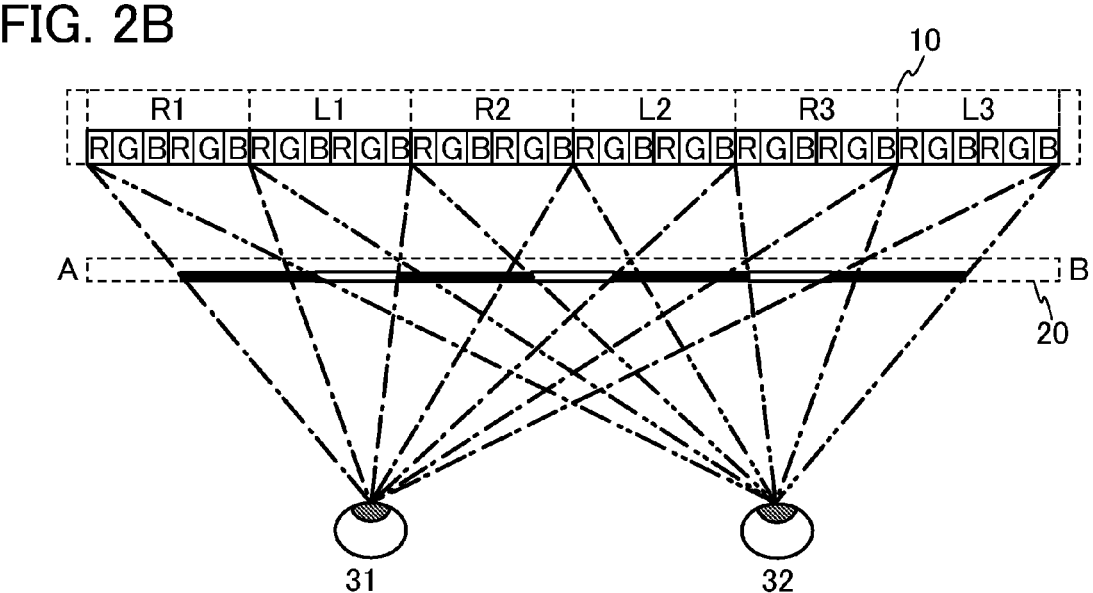

FIG. 2B is a schematic diagram illustrating the structure of the display device according to this embodiment in the case where the distance between the viewer and the display device is smaller than that shown in FIG. 2A. In the display panel 10 according to this embodiment, regarding two pixel regions as a display element unit, right eye 3D displays (R1 to R3) can be performed in pixel regions adjacent to pixel regions where left eye 3D displays (L1 to L3) are performed. Specifically, two pixel regions can serve as the display element unit by supplying a common image signal to two sub-pixels that express the same color (one of red, green, and blue) in the two pixel regions. In addition, the shutter panel 20 according to this embodiment can be controlled so that the left eye 31 perceives only the pixel regions where the left eye 3D displays (L1 to L3) are performed, and the right eye 32 perceives only the pixel regions where the right eye 3D displays (R1 to R3) are performed. Specifically, optical shutter regions positioned between the left eye 31 and the pixel regions where the right eye 3D displays (R1 to R3) are performed and optical shutter regions positioned between the right eye 32 and the pixel regions where the left eye 3D displays (L1 to L3) are performed are brought into a light-shielding state (black portions in FIG. 2B), and the other regions are brought into a light-transmitting state.

In the above manner, in the display device according to one embodiment of the present invention, 3D images can be displayed under two conditions with different distances between the viewer and the display device.

Each of a plurality of barriers (a plurality of black portions in FIGS. 2A and 2B) formed in the shutter panel under the conditions shown in FIGS. 2A and 2B includes one or a plurality of optical shutter regions. That is, the barrier is not necessarily formed using one optical shutter region.

FIGS. 2A and 2B illustrate the pixel region composed of RGB sub-pixels; however, the structure of the pixel region is not limited to this. In other words, the pixel region can be composed of a combination of three sub-pixels each expressing a different color. Moreover, the pixel region can be composed of a combination of four or more sub-pixels each expressing a different color (e.g., R, G, B, and Y (a sub-pixel for expressing yellow).

FIG. 2B shows the structure in which all of six sub-pixels included in each display element unit performing the left eye 3D display (L1 to L3) or the right eye 3D display (R1 to R3) express one of red, green, and blue; alternatively, one to three sub-pixels among the six sub-pixels can express black (K). For example, it is possible to employ a structure (see FIG. 3A) in which three sub-pixels included in one of two pixel regions of the display element unit express one of red, green, and blue and the sub-pixels included in the other pixel region express black (K). In addition, it is possible to employ a structure (see FIG. 3B) in which in two pixel regions of the display element unit, sub-pixels involved in displaying images vary between display element units. Further, it is possible to employ a structure (see FIG. 3C) in which four sub-pixels among six sub-pixels included in two pixel regions of the display element unit express one of red, green, and blue and the other two sub-pixels express black (K). In the structure illustrated in FIG. 3C, only one given color is expressed by two sub-pixels, and the other two colors are each expressed by one sub-pixel. In that case, it is preferable to adjust image signals input to sub-pixels so that the luminance of three colors is uniform.

Figure 3A:
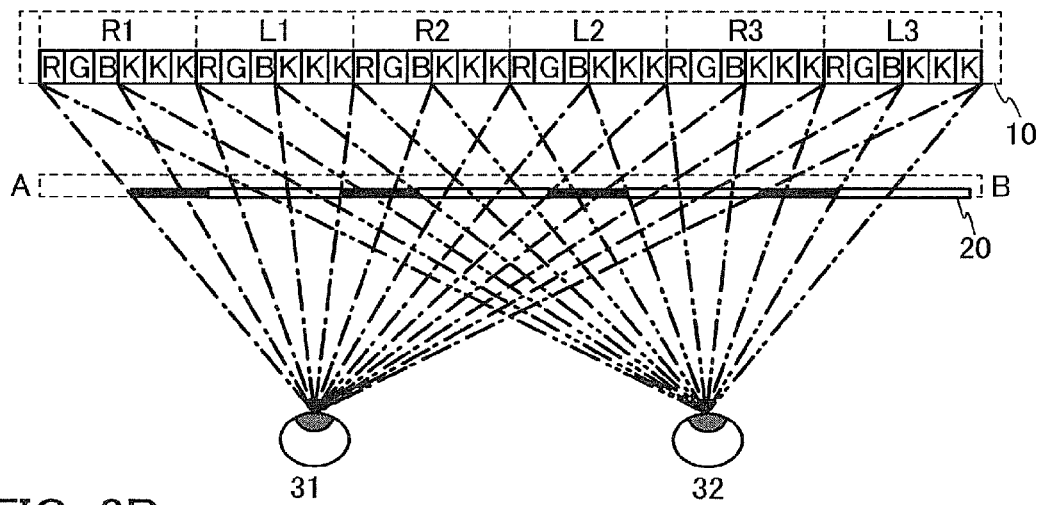
FIGS. 3A to 3C illustrate the relation between a light-shielding portion, a display panel, and a viewer.
Figure 3B:
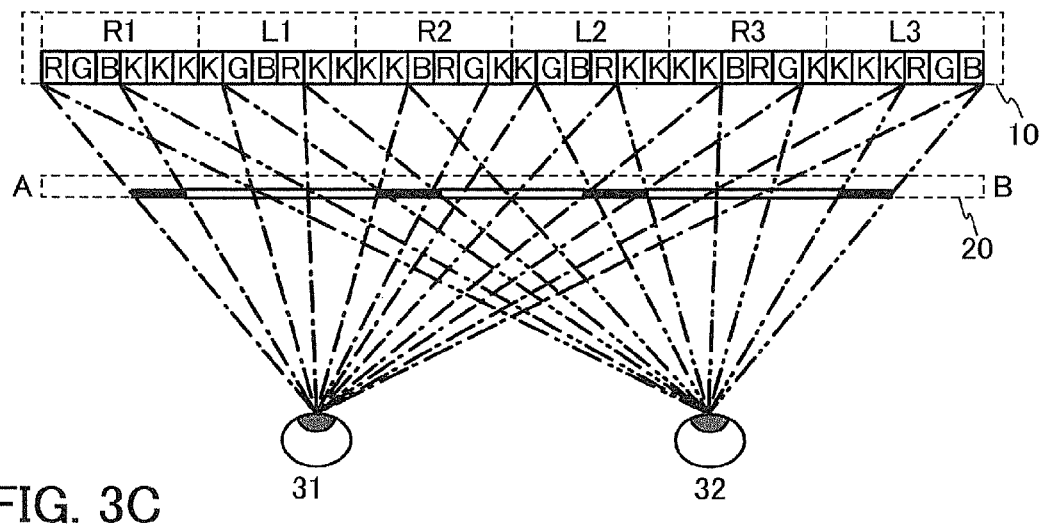
Figure 3C:
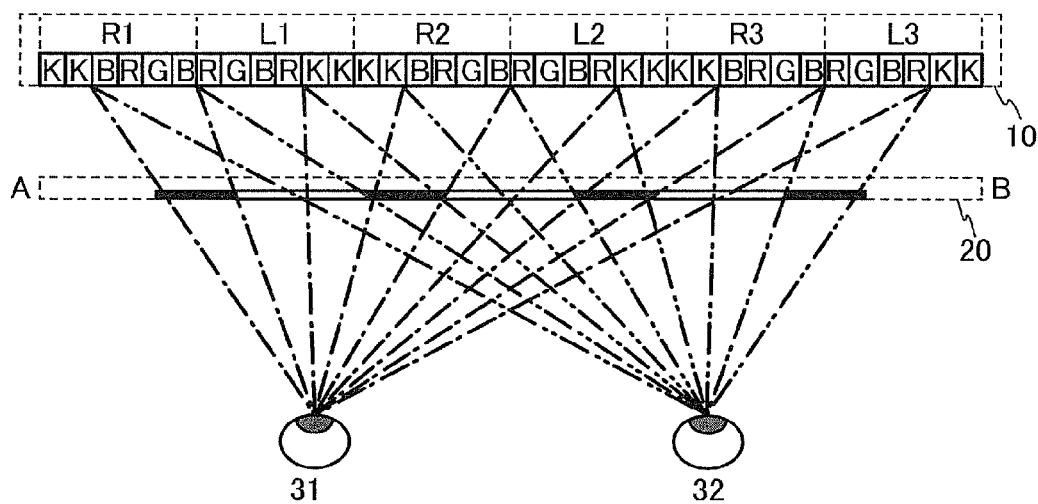

In the case where the display device has a structure in which light emission of a light-emitting element is controlled in each sub-pixel (e.g., the display device uses organic electroluminescence), power consumption can be reduced by performing partial black display (K) as shown in FIGS. 3A to 3C.

Although the positions of the barriers provided in the shutter panel differ between FIG. 2B and FIGS. 3A to 3C, 3D images can be displayed in any of these cases. That is, it is possible to select one from the conditions in FIG. 2B and FIGS. 3A to 3C as appropriate in accordance with arrangement of the plurality of optical shutter regions provided in the shutter panel, for example.

FIG. 2B and FIGS. 3A to 3C each show the structure in which the display element unit has two pixel regions; alternatively, the display element unit can have three or more pixel regions.

Figure 4A:
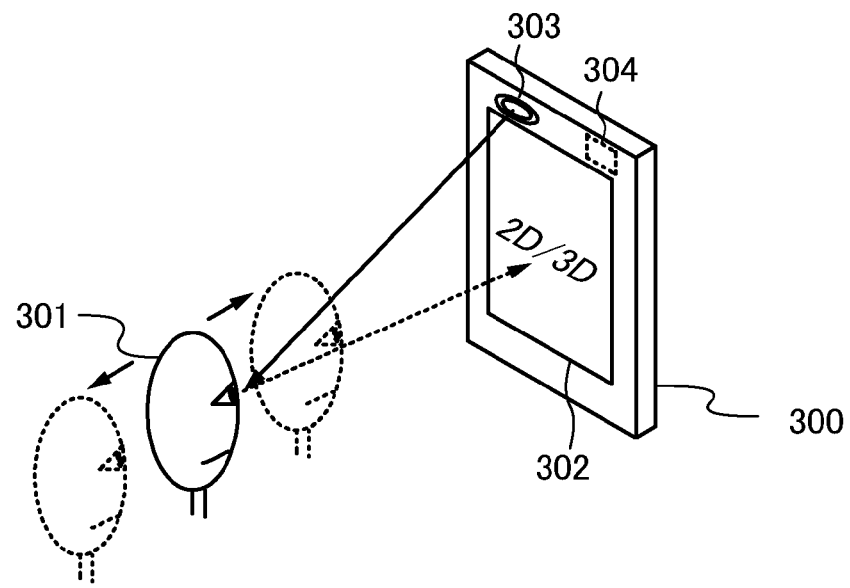
FIG. 4A is a diagram illustrating an application example of a display device.

Next, FIG. 4A is a schematic diagram illustrating an application example of the above-described display device in this embodiment, used by the viewer.

FIG. 4A shows a display device 300 and a viewer 301. The display device 300 includes a distance sensor 303 and an angular sensor 304 in addition to a display portion 302 including the above-described display panel and shutter panel. The distance sensor 303 and the angular sensor 304 are provided as means for measuring the distance between the display device 300 and the viewer 301, and shown as one structure example for measuring the distance.

The distance sensor 303 and the angular sensor 304, which are the measurement means, measure the distance between the display device 300 and the viewer 301. The distance between the display device 300 and the viewer 301 is preferably measured with high accuracy, for example, by a combination of distance detection by the distance sensor 303 such as an infrared sensor and angular detection by the angular sensor 304 such as a gyro sensor. In the display device 300, the width of the parallax barrier formed using the optical shutter regions 200 in the shutter panel 20 is variable in accordance with the aforementioned distance. In other words, the display device in this embodiment can make the viewer perceive 3D display by generating binocular parallax between the left eye and the right eye even if the viewer 301 looks at the display portion 302 without fixing the distance with the display device 300.

Figure 4B:
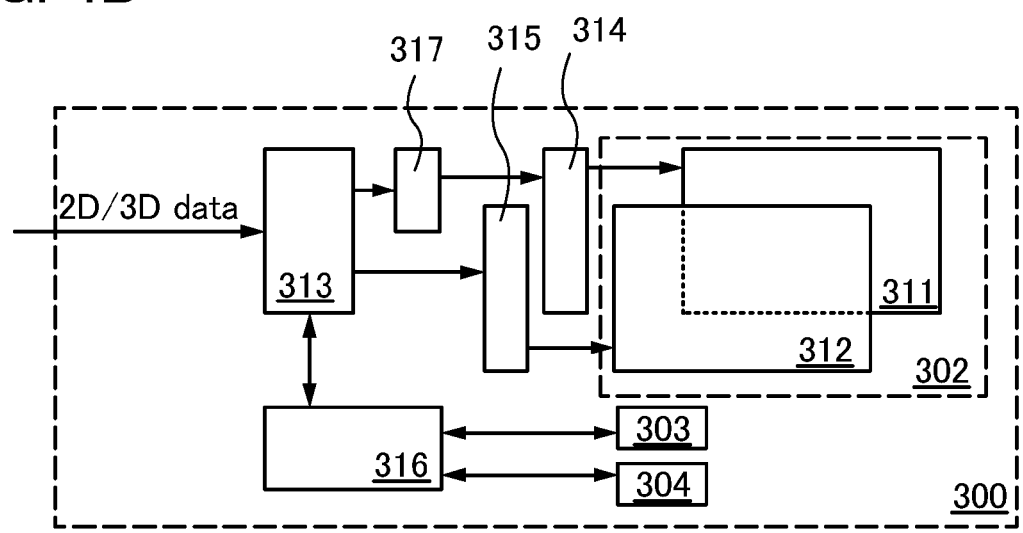
FIG. 4B is a block diagram of the display device.

FIG. 4B is a block diagram of the display device 300 including the distance sensor 303 and the angular sensor 304 described with reference to FIG. 4A. The display device 300 illustrated in the block diagram of FIG. 4B includes a display panel 311, a shutter panel 312, an application processor 313, a display panel control circuit 314, a shutter panel control circuit 315, a sensor control circuit 316, and an image data switching circuit 317 in addition to the display portion 302, the distance sensor 303, and the angular sensor 304 described in FIG. 4A.

The display panel 311 and the shutter panel 312 included in the display portion 302 are the display panel and the shutter panel described using FIG. 1, which means that 3D images can be displayed even when the distance between the display device and the viewer is changed.

The sensor control circuit 316 can measure the distance with the viewer by the distance sensor 303 and the angular sensor 304. Data on the distance between the display device and the viewer, obtained by the sensor control circuit 316, is output to the application processor 313.

The application processor 313 is supplied with image data for 2D display or 3D display from the outside. The application processor 313 controls the image data switching circuit 317 in accordance with image data supplied from the outside and data on the distance between the display device and the viewer, supplied from the sensor control circuit 316. The image data switching circuit 317 converts image data supplied to the display panel 311 according to display element units of the pixel regions. The display panel control circuit 314 controls display of images on the display panel 311 in accordance with the converted image data. Further, the application processor 313 controls the shutter panel control circuit 315 in accordance with data on the distance between the display device and the viewer, supplied from the sensor control circuit 316. The shutter panel control circuit 315 controls the shutter panel 312.

With the above-described structure in this embodiment, the range of distance with which the viewer can see 3D images by the naked eye can be increased; therefore, a highly convenient display device can be provided.

This embodiment can be implemented in appropriate combination with the structures described in the other embodiments.

Embodiment 2

In this embodiment, specific examples of a shutter panel in the display device according to one embodiment of the present invention will be described with reference to FIGS. 5A to 5D and FIGS. 6A and 6B. The shutter panel described in this embodiment is a specific example of the shutter panel 20 in Embodiment 1.

The shutter panel is constituted by a plurality of optical elements whose state is switched between a light-shielding state and a light-transmitting state. As the optical element, it is preferable to use a liquid crystal element in which liquid crystal is placed between a pair of electrodes. By application of voltage to the liquid crystal element, alignment of the liquid crystal is controlled to selectively control the state (a light-shielding state or a light-transmitting state) of the liquid crystal element.

Figure 5A:
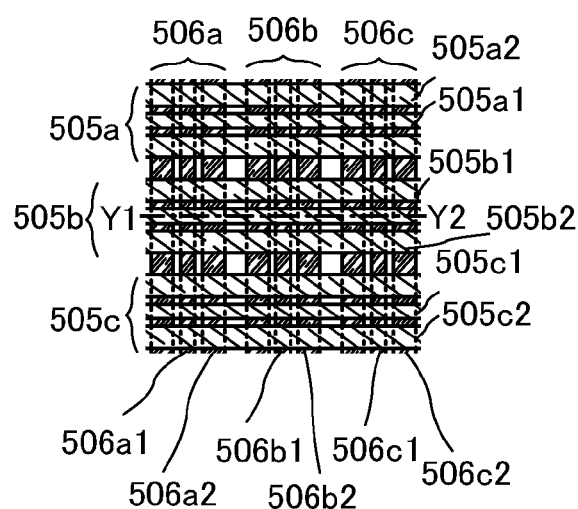
FIGS. 5A to 5D illustrate embodiments of shatter panels.
Figure 5B:
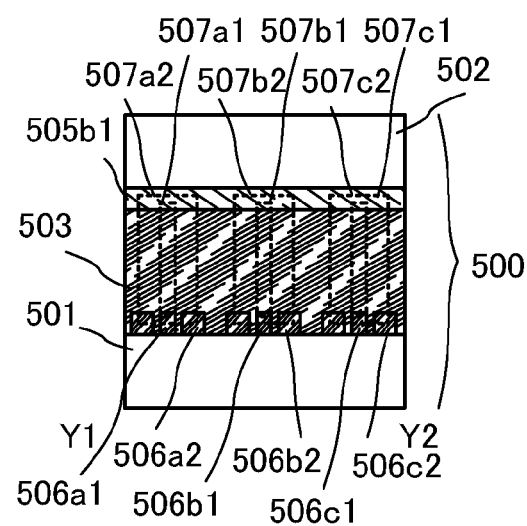

FIGS. 5A and 5B illustrate a shutter panel 500. FIG. 5A is a plan view of the shutter panel 500. FIG. 5B is a cross-sectional view along Y1-Y2 in FIG. 5A.

In the shutter panel 500, liquid crystal 503 is sandwiched between electrodes 506 (506a, 506b, and 506c) provided on a substrate 501 and electrodes 505 (505a, 505b, and 505c) provided on a substrate 502. The electrodes 506 (506a, 506b, and 506c) are arranged in a stripe pattern, and the electrodes 506a, 506b, and 506c are divided into electrodes 506a1 and 506a2, 506b1 and 506b2, and 506c1 and 506c2, respectively. In this embodiment, the electrodes 506a2 (506b2 and 506c2) are placed on the both sides of the electrode 506a1 (506b1 and 506c1) so that the electrode 506a1 (506b1 and 506c1) is sandwiched therebetween. The electrode 506a1 (506b1 and 506c1) and the electrode 506a2 (506b2 and 506c2) are electrically independent of each other, and can be controlled by supplying different potentials.

In addition, the electrodes 505 (505a, 505b, and 505c) are arranged in a stripe pattern like the electrodes 506a, 506b, and 506c, and the electrodes 505a, 505b, and 505c are divided into electrodes 505a1 and 505a2, 505b1 and 505b2, and 505c1 and 505c2, respectively. In this embodiment, the electrodes 505a2 (505b2 and 505c2) are placed on the both sides of the electrode 505a1 (505b1 and 505c1) so that the electrode 505a1 (505b1 and 505c1) is sandwiched therebetween. The electrode 505a1 (505b1 and 505c1) and the electrode 505a2 (505b2 and 505c2) are electrically independent of each other, and can be controlled by supplying different potentials. The stripe-shaped electrodes 506a, 506b, and 506c and the stripe-shaped electrodes 505a, 505b, and 505c overlap with each other in a grid pattern with liquid crystal placed therebetween, whereby liquid crystal elements can be formed in a dot pattern; thus, the light-shielding region and the light-transmitting region can be controlled more precisely.

Note that it is possible that the electrodes 505a, 505b, and 505c and the electrodes 506a, 506b, and 506c are divided into three or more electrodes, and that the electrodes have a different width.

Figure 5C:
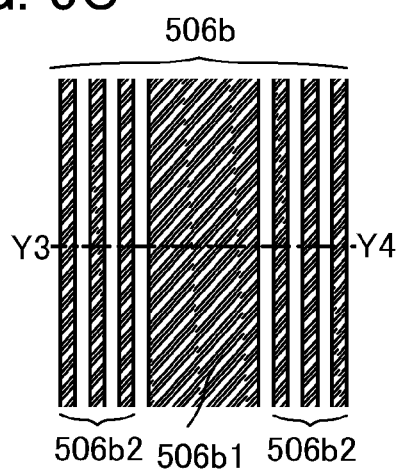
Figure 5D:
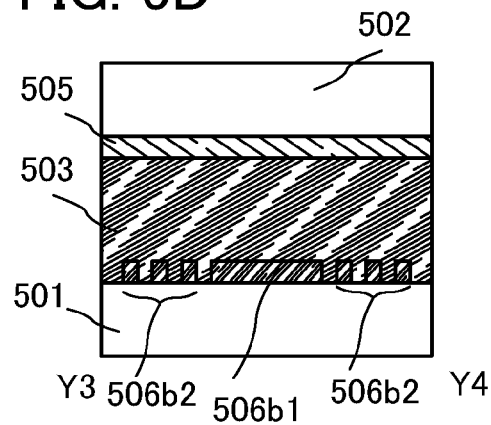

FIGS. 5C and 5D illustrate the electrode 506b as an example of another shape applicable to the electrodes 506a, 506b, and 506c and the electrodes 505a, 505b, and 505c. FIG. 5C is a plan view of the electrode 506b. FIG. 5D is a cross-sectional view along Y3-Y4 in FIG. 5C.

As an example, as the electrode 506b in FIGS. 5C and 5D, a plurality of narrower electrodes 506b2 of a second liquid crystal element 507b2 are provided on the both sides of the electrode 506b1 of a first liquid crystal element 507b1. As described above, it is possible that the second liquid crystal element has a plurality of electrodes which are smaller in width than the electrode of the first liquid crystal element.

The electrodes 506a1, 506b1, and 506c1 and the electrodes 506a2, 506b2, and 506c2 each sandwich the liquid crystal 503 with the electrode 505 and thus form first liquid crystal elements 507a1, 507b1, and 507c1 and second liquid crystal elements 507a2, 507b2, and 507c2 adjacent to the first liquid crystal elements 507a1, 507b1, and 507c1. The first liquid crystal elements 507a1, 507b1, and 507c1 and the second liquid crystal elements 507a2, 507b2, and 507c2 can be controlled electrically independently of each other.

When 3D images are to be displayed, the light-shielding region can be selectively determined by controlling the first liquid crystal elements 507a1, 507b1, and 507c1 and the second liquid crystal elements 507a2, 507b2, and 507c2. For example, when a viewer is relatively far from the shutter panel 500, only the first liquid crystal elements 507a1, 507b1, and 507c1 are driven to form a first light-shielding region, and a first display state can be provided as 3D display to the viewer. On the other hand, when the viewer is close to the shutter panel 500, both the first liquid crystal elements 507a1, 507b1, and 507c1 and the second liquid crystal elements 507a2, 507b2, and 507c2 are driven to form a second light-shielding region larger than the first light-shielding region, and a second display state can be provided as 3D display to the viewer.

Figure 6A:
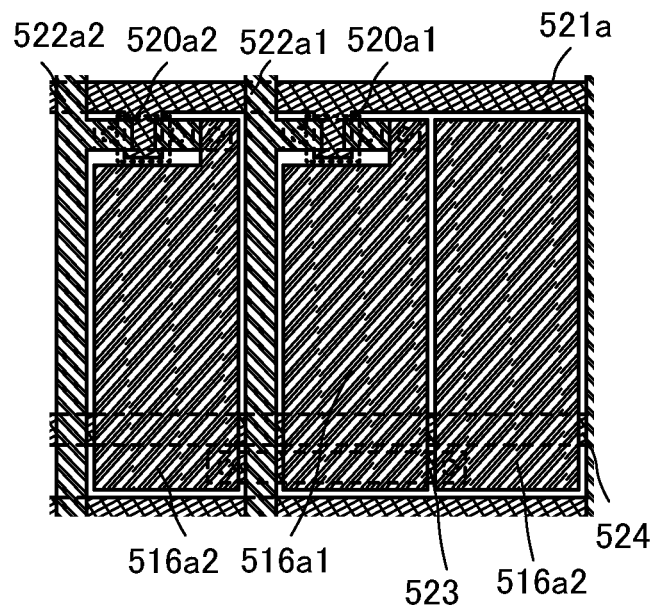
FIGS. 6A and 6B illustrate embodiments of shatter panels.
Figure 6B:
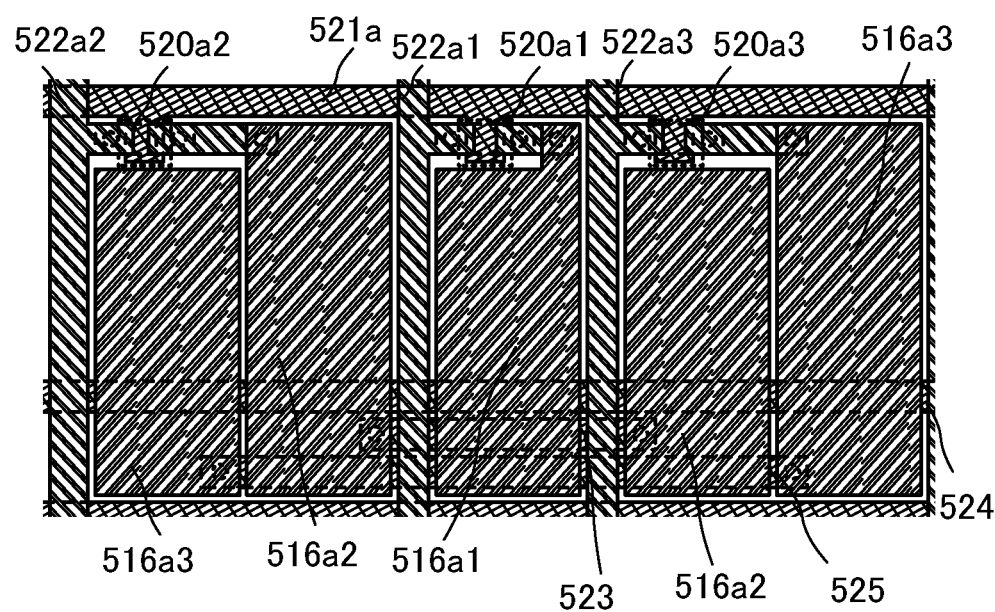

In addition, an element that functions as a switch electrically connected to a liquid crystal element can be provided to control the liquid crystal element. FIGS. 6A and 6B each illustrate an example in which a transistor is provided as an element functioning as a switch to drive a liquid crystal element.

A shutter panel in FIG. 6A includes a first liquid crystal element having an electrode 516a1 electrically connected to a transistor 520a1, a second liquid crystal element that is adjacent to the first liquid crystal element and has an electrode 516a2 electrically connected to a transistor 520a2, and a capacitor wiring 524. Although not illustrated, electrodes paired with the electrodes 516a1 and 516a2 are provided over the electrodes 516a1 and 516a2 with liquid crystal placed therebetween.

The transistors 520a1 and 520a2 are electrically connected to a wiring 521a, and electrically connected to a wiring 522a1 and a wiring 522a2, respectively. The electrodes 516a2 which are included in the second liquid crystal elements and positioned so that the electrode 516a1 is placed therebetween are electrically connected to each other through a wiring 523.

FIG. 6B shows an example in which a shutter panel further includes a third liquid crystal element that is adjacent to the second liquid crystal element and has an electrode 516a3 electrically connected to a transistor 520a3. The electrodes 516a2 which are included in the second liquid crystal elements and positioned so that the electrode 516a1 is placed therebetween are electrically connected to each other through the wiring 523. The electrodes 516a3 which are included in the third liquid crystal elements and positioned so that the electrode 516a1 and the electrodes 516a2 are placed therebetween are electrically connected to each other through a wiring 525.

FIG. 6B shows an example where the transistors 520a1, 520a2, and 520a3 are planar transistors with a top-gate structure in which a semiconductor layer, a gate insulating layer, a gate electrode layer, an interlayer insulating layer, and a source electrode layer are stacked in this order. The wirings 523 and 525 and the capacitor wiring 524 can be formed in the same step as the wiring 521a.

FIGS. 6A and 6B show an example in which the sizes (areas) of the electrodes 516a1, 516a2, and 516a3 are almost the same; however, there is no particular limitation on the sizes, and the electrodes 516a1, 516a2, and 516a3 may have a different size. Further, a larger number of (three or more) liquid crystal elements may be provided on the both sides of the liquid crystal element having the electrode 516a.

When 3D images are to be displayed, the light-shielding region can be selectively determined by controlling the first liquid crystal element, the second liquid crystal element, and the third liquid crystal element. The light-shielding regions with different areas can be formed in the same shutter panel as follows, for example: a first light-shielding region formed by driving only the first liquid crystal element, a second light-shielding region formed by driving the first and second liquid crystal elements, and a third light-shielding region formed by driving the first, second, and third liquid crystal elements. When liquid crystal elements that express black at the time of voltage application are used as the first, second, and third liquid crystal elements, a light-shielding region can be extended in the shutter panel along with an increase in the number of driven liquid crystal elements.

Although not shown in this embodiment, the shutter panel is provided with an optical film such as a polarizing plate, a retardation plate, or an anti-reflection film, or the like as appropriate. For the shutter panel, a transmissive liquid crystal element with a variety of structures and a variety of liquid crystal modes can be employed.

For example, in the structure where liquid crystal is sandwiched between a pair of electrodes as shown in FIGS. 5A to 5D, it is possible to use a method of controlling gray level by generating an electric field substantially vertical to the substrate to move liquid crystal molecules in the plane vertical to the substrate. Further, when the electrodes of the liquid crystal element in FIGS. 6A and 6B have a structure used for the IPS mode or the FFS mode, it is possible to use a method of controlling gray level by generating an electric field substantially parallel (horizontal) to the substrate to move liquid crystal molecules in the plane parallel to the substrate.

There is no particular limitation on the structure of the transistor used in the shutter panel; for example, a staggered transistor or a planar transistor having a top-gate structure or a bottom-gate structure can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel formation region with a gate insulating layer provided therebetween.

This embodiment can be implemented in appropriate combination with the structures described in the other embodiments.

Embodiment 3

In this embodiment, examples of the structure of a display panel applicable to the display panel in Embodiment 1 will be described with reference to FIGS. 7A and 7B and FIGS. 8A and 8B.

As a display element provided in the display panel, a light-emitting element (also referred to as a light-emitting display element) or a liquid crystal element (also referred to as a liquid crystal display element) can be used. A light-emitting element includes, in its category, an element whose luminance is controlled by current or voltage, and specifically includes an inorganic electroluminescent (EL) element, an organic EL element, and the like.

FIGS. 7A and 7B illustrate an example of the structure of a display panel in which an organic EL element is used as a display element. FIG. 7A is a plan view of the display panel. FIG. 7B is a cross-sectional view along A-B and C-D in FIG. 7A. An element substrate 410 is fixed to a sealing substrate 404 with a sealant 405, and includes driver circuit units (a source driver circuit 401 and a gate driver circuit 403) and a pixel portion 402 including a plurality of pixels.

A wiring 408 is a wiring for transmitting signals input to the source driver circuit 401 and the gate driver circuit 403, and receives a video signal, a clock signal, a start signal, a reset signal, and the like from a flexible printed circuit (FPC) 409 serving as an external input terminal. Although only the FPC is illustrated here, a printed wiring board (PWB) may be attached to the FPC. The display panel in this specification includes not only a main body of the display panel but one with an FPC or a PWB attached thereto.

The driver circuit units (the source driver circuit 401 and the gate driver circuit 403) and the pixel portion 402 are formed over the element substrate 410. FIG. 7B illustrates the source driver circuit 401, which is the driver circuit unit, and three pixels in the pixel portion 402.

This embodiment explains an example in which the pixel portion 402 includes pixels of three colors: a blue (B) pixel 420a, a green (G) pixel 420b, and a red (R) pixel 420c. Note that this embodiment is not limited to this example, and a display panel can display multi-color images by including pixels of at least two colors in the pixel portion 402, or alternatively may be a display panel for single color display.

Pixels 420a, 420b, and 420c respectively include color filter layers 434a, 434b, and 434c; light-emitting elements 418a, 418b, and 418c; and transistors 412a, 412b, and 412c that are electrically connected to the light-emitting elements 418a, 418b, and 418c and function as switching transistors.

The color filter layer can be provided to correspond to the color of each pixel so as to fill openings provided in a light-shielding layer 435. For example, the color filter layer 434a of the blue (B) pixel 420a is blue; the color filter layer 434b of the green (G) pixel 420b is green; and the color filter layer 434c of the red (R) pixel 420c is red.

The light-emitting elements 418a, 418b, and 418c include respective reflective electrodes 413a, 413b, and 413c, an EL layer 431, and a light-transmitting electrode 433. The reflective electrodes 413a, 413b, and 413c or the light-transmitting electrode 433 is used as an anode and the rest of them is used as a cathode.

The EL layer 431 has at least a light-emitting layer. The EL layer 431 can have a stacked structure including a hole-injection layer, a hole-transport layer, an electron-transport layer, an electron-injection layer, and/or the like in addition to the light-emitting layer. In addition, a plurality of EL layers may be stacked, and a charge generation layer may be provided between one EL layer and another EL layer. When a plurality of light-emitting layers are stacked between the anode and the cathode, the light-emitting element can emit white light, for example.

Light-transmitting conductive layers 415a, 415b, and 415c may be provided between the respective reflective electrodes 413a, 413b, and 413c and the EL layer 431. The light-transmitting conductive layers 415a, 415b, and 415c have a function of adjusting the optical distance between the reflective electrodes 413a, 413b, and 413c and the light-transmitting electrode 433 in each pixel. By enhancing a desired spectrum with a microcavity for each light-emitting element, a display panel with high color purity can be provided.

FIG. 7B shows the top-emission display panel that includes a combination of light-emitting elements emitting white light and color filters; the display panel can be a top-emission display panel including light-emitting elements formed by a separate coloring method. A separate coloring method is a method by which materials for RGB are applied to respective pixels by evaporation or the like.

When the light-emitting layer is formed as a continuous film instead of being separately formed for every pixel using a metal mask, a reduction in yield and complication of the process due to the use of the metal mask can be avoided. Consequently, a high definition display panel with high color reproducibility can be achieved.

As the source driver circuit 401, a CMOS circuit including a combination of an n-channel transistor 423 and a p-channel transistor 424 is formed. The driver circuit may be constituted by a variety of circuits formed with transistors, such as a CMOS circuit, a PMOS circuit, or an NMOS circuit. This embodiment explains the example in which the source driver circuit and the gate driver circuit are formed over the substrate; however, the structure is not necessarily limited thereto, and part or all of the source driver circuit and the gate driver circuit can be formed outside the substrate instead of over the substrate.

An insulator 414 is formed to cover end portions of the reflective electrodes 413a, 413b, and 413c and the light-transmitting conductive layers 415a, 415b, and 415c. Here, the insulator 414 is formed using a positive type photosensitive acrylic resin film.

In order to improve the coverage, the insulator 414 is provided such that either an upper end portion or a lower end portion of the insulator 414 has a curved surface with a curvature. For example, when positive type photosensitive acrylic is used as a material for the insulator 414, it is preferable that only the upper end portion of the insulator 414 have a curved surface with a curvature radius (0.2 μm to 3 μm). The insulator 414 can be formed using either a negative type which becomes insoluble in an etchant by light irradiation or a positive type which becomes soluble in an etchant by light irradiation.

The sealing substrate 404 is attached to the element substrate 410 with the sealant 405; thus, the light-emitting elements 418a, 418b, and 418c are provided in a space 407 enclosed by the element substrate 410, the sealing substrate 404, and the sealant 405. The space 407 is filled with a filler such as an inert gas (e.g., nitrogen or argon), an organic resin, or the sealant 405. As the organic resin and the sealant 405, materials containing a hygroscopic substance may be used.

Note that as the sealant 405, an epoxy-based resin is preferably used. It is preferable that such a material do not transmit moisture or oxygen as much as possible. As the sealing substrate 404, a glass substrate, a quartz substrate, or a plastic substrate of fiberglass-reinforced plastics (FRP), polyvinyl fluoride (PVF), polyester, acrylic, or the like can be used.

As in this embodiment, an insulating film 411 serving as a base film may be provided between the element substrate 410 and a semiconductor layer of the transistor. The insulating film has a function of preventing diffusion of an impurity element from the element substrate 410, and can be formed with a single-layer structure or a stacked structure using one or more of a silicon nitride film, a silicon oxide film, a silicon nitride oxide film, and a silicon oxynitride film.

In this embodiment, there is no particular limitation on the structure of the transistor applicable to the display panel; for example, a staggered transistor or a planar transistor having a top-gate structure or a bottom-gate structure can be used. The transistor may have a single-gate structure in which one channel formation region is formed, a double-gate structure in which two channel formation regions are formed, or a triple-gate structure in which three channel formation regions are formed. Alternatively, the transistor may have a dual-gate structure including two gate electrode layers positioned over and below a channel formation region with a gate insulating layer provided therebetween.

The gate electrode layer can be formed with a single-layer structure or a stacked structure using a metal material such as molybdenum, titanium, chromium, tantalum, tungsten, aluminum, copper, neodymium, or scandium or an alloy material that contains any of these materials as its main component.

For example, as a two-layer structure of the gate electrode layer, the following structures are preferable: a two-layer structure of an aluminum layer and a molybdenum layer stacked thereover, a two-layer structure of a copper layer and a molybdenum layer stacked thereover, a two-layer structure of a copper layer and a titanium nitride layer or a tantalum nitride layer stacked thereover, and a two-layer structure of a titanium nitride layer and a molybdenum layer. As a three-layer structure, it is preferable to employ a stacked structure in which a tungsten layer or a tungsten nitride layer, an alloy layer of aluminum and silicon or an alloy layer of aluminum and titanium, and a titanium nitride layer or a titanium layer are stacked.

The gate insulating layer can be formed with a single-layer structure or a stacked structure of a silicon oxide layer, a silicon nitride layer, a silicon oxynitride layer, and/or a silicon nitride oxide layer by plasma CVD, sputtering, or the like. Alternatively, a silicon oxide layer formed by CVD using an organosilane gas can be used as the gate insulating layer. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

A material of the semiconductor layer is not limited to a particular material and determined in accordance with characteristics needed for the transistors 412a, 412b, 412c, 423, and 424 as appropriate. Examples of a material that can be used for the semiconductor layer will be described.

The semiconductor layer can be formed using the following material: an amorphous semiconductor manufactured by sputtering or vapor-phase growth using a semiconductor material gas typified by silane or germane; a polycrystalline semiconductor formed by crystallizing the amorphous semiconductor with the use of light energy or thermal energy; a microcrystalline semiconductor; or the like. The semiconductor layer can be deposited by sputtering, LPCVD, plasma CVD, or the like.

For the semiconductor layer, a single crystal semiconductor (e.g. silicon or silicon carbide) can be used. When a single crystal semiconductor is used for the semiconductor layer, the size of the transistor can be reduced, leading to a higher density of pixels in a display portion. When a single crystal semiconductor is used for the semiconductor layer, an SOI substrate including a single crystal semiconductor layer can be used. Alternatively, a semiconductor substrate such as a silicon wafer may be used.

A typical example of an amorphous semiconductor is hydrogenated amorphous silicon, and a typical example of a crystalline semiconductor is polysilicon. Examples of polysilicon (polycrystalline silicon) are high-temperature polysilicon that contains polysilicon formed at a process temperature of 800° C. or higher as its main component, low-temperature polysilicon that contains polysilicon formed at a process temperature of 600° C. or lower as its main component, and polysilicon obtained by crystallizing amorphous silicon using an element that promotes crystallization or the like. Needless to say, a microcrystalline semiconductor or a semiconductor that includes a crystalline phase in part of a semiconductor layer can be used as described above.

Further, an oxide semiconductor may be used. Examples of an oxide semiconductor are an In—Sn—Ga—Zn—O-based oxide semiconductor which is an oxide of four metal elements; an In—Ga—Zn—O-based oxide semiconductor, an In—Sn—Zn—O-based oxide semiconductor, an In—Al—Zn—O-based oxide semiconductor, a Sn—Ga—Zn—O-based oxide semiconductor, an Al—Ga—Zn—O-based oxide semiconductor, and a Sn—Al—Zn—O-based oxide semiconductor which are oxides of three metal elements; an In—Zn—O-based oxide semiconductor, a Sn—Zn—O-based oxide semiconductor, an Al—Zn—O-based oxide semiconductor, a Zn—Mg—O-based oxide semiconductor, a Sn—Mg—O-based oxide semiconductor, an In—Mg—O-based oxide semiconductor, and In—Ga—O-based oxide semiconductor which are oxides of two metal elements; and an In—O-based oxide semiconductor, a Sn—O-based oxide semiconductor, and a Zn—O-based oxide semiconductor which are oxides of one metal element. Moreover, $SiO_2$ may be contained in the above oxide semiconductor. Here, for example, the In—Ga—Zn—O-based oxide semiconductor means an oxide containing at least In, Ga, and Zn, and there is no particular limitation on the composition ratio of the elements. The In—Ga—Zn—O-based oxide semiconductor may contain an element other than In, Ga, and Zn.

For the oxide semiconductor layer, a thin film expressed by a chemical formula of $InMO_3(ZnO)_m$ (m>0) can be used. Here, M represents one or more metal elements selected from Ga, Al, Mn, and Co. For example, M can be Ga, Ga and Al, Ga and Mn, or Ga and Co.

In the case where an In—Zn—O-based material is used as the oxide semiconductor, the atomic ratio is In/Zn=0.5 to 50, preferably In/Zn=1 to 20, further preferably In/Zn=1.5 to 15. When the atomic ratio of Zn is in the above preferred range, the field-effect mobility of the transistor can be improved. Here, when the atomic ratio of the compound is In:Zn:O=X:Y:Z, the relation Z>1.5X+Y is satisfied.

For the oxide semiconductor layer, it is possible to use an oxide including a crystal with c-axis alignment (also referred to as a c-axis aligned crystal (CAAC)), which has neither a single crystal structure nor an amorphous structure.

Examples of a material of wiring layers serving as source and drain electrode layers are an element selected from Al, Cr, Ta, Ti, Mo, and W; an alloy containing any of the above elements as its component; and an alloy film containing a combination of any of these elements. Further, in the case where heat treatment is performed, the conductive film preferably has heat resistance against the heat treatment. Since the use of aluminum alone brings disadvantages such as low heat resistance and a tendency to corrosion, aluminum is used in combination with a conductive material having heat resistance. As the conductive material having heat resistance, which is used in combination with aluminum, it is possible to use an element selected from titanium (Ti), tantalum (Ta), tungsten (W), molybdenum (Mo), chromium (Cr), neodymium (Nd), and scandium (Sc), an alloy containing any of these elements as its component, an alloy containing a combination of any of these elements, or a nitride containing any of these elements as its component.

As an insulating film 419 that covers the transistor, an inorganic insulating film or an organic insulating film formed by a dry method or a wet method can be used. For example, it is possible to use a silicon nitride film, a silicon oxide film, a silicon oxynitride film, an aluminum oxide film, a tantalum oxide film, or a gallium oxide film formed by CVD, sputtering, or the like. Moreover, an organic material such as polyimide, acrylic, benzocyclobutene, polyamide, or an epoxy resin can be used. Other than such organic materials, it is also possible to use a low-dielectric constant material (a low-k material), a siloxane-based resin, PSG (phosphosilicate glass), BPSG (borophosphosilicate glass), or the like.

Note that a siloxane-based resin corresponds to a resin including a Si—O—Si bond formed using a siloxane-based material as a starting material. A siloxane-based resin may include an organic group (e.g., an alkyl group or an aryl group) or a fluoro group as a substituent. In addition, the organic group may include a fluoro group. A siloxane-based resin is applied by a coating method and baked; thus, the insulating film 419 can be formed.

Note that the insulating film 419 may be formed by stacking a plurality of insulating films each formed using any of the above materials. For example, the insulating film 419 may have a structure in which an organic resin film is stacked over an inorganic insulating film.

FIGS. 8A and 8B illustrate an example of a display panel including a liquid crystal element as a display element. FIG. 8A is a plan view of a display panel, and FIG. 8B is a cross-sectional view along E-F in FIG. 8A. The structure of the panel including the liquid crystal element shown in this embodiment can be employed as the structure of the shutter panel as appropriate.

In FIGS. 8A and 8B, a sealant 605 is provided so as to surround a pixel portion 602 and a scan line driver circuit 604 which are provided over a first substrate 601. A second substrate 606 is provided over the pixel portion 602 and the scan line driver circuit 604. Thus, the pixel portion 602 and the scan line driver circuit 604 are sealed together with the display element by the first substrate 601, the sealant 605, and the second substrate 606.

In FIG. 8A, a signal line driver circuit 603 that is formed using a single crystal semiconductor film or a polycrystalline semiconductor film over a substrate separately prepared is mounted in a region different from the region surrounded by the sealant 605 over the first substrate 601. A variety of signals and potentials are supplied to the signal line driver circuit 603, the scan line driver circuit 604, and the pixel portion 602 from an FPC 618.

In FIGS. 8A and 8B, the display panel includes a connection terminal electrode 615 and a terminal electrode 616. The connection terminal electrode 615 and the terminal electrode 616 are electrically connected to a terminal of the FPC 618 via an anisotropic conductive film 619. The connection terminal electrode 615 is formed using the same conductive film as a first electrode layer 630 of the liquid crystal element, and the terminal electrode 616 is formed using the same conductive film as source and drain electrodes of transistors 610 and 611.

The pixel portion 602 and the scan line driver circuit 604, which are provided over the first substrate 601, each include a plurality of transistors. FIG. 8B illustrates the transistor 610 included in the pixel portion 602 and the transistor 611 included in the scan line driver circuit 604.

In FIG. 8B, a liquid crystal element 613, which is the display element, includes the first electrode layer 630, a second electrode layer 631, and the liquid crystal layer 608. Insulating films 632 and 633 serving as alignment films are provided so that the liquid crystal layer 608 is sandwiched therebetween. The second electrode layer 631 is provided on the second substrate 606 side, and the first electrode layer 630 and the second electrode layer 631 are stacked with the liquid crystal layer 608 placed therebetween.

A columnar spacer 635 is obtained by selective etching of an insulating film. The spacer is provided to control the thickness (cell gap) of the liquid crystal layer 608. Alternatively, a spherical spacer may be used.

In the case where a liquid crystal element is used as the display element, thermotropic liquid crystal, low-molecular liquid crystal, high-molecular liquid crystal, polymer dispersed liquid crystal, ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition that includes a liquid crystal showing a blue phase and a chiral agent has a short response time of 1 ms (millisecond) or less and has optical isotropy; therefore, the alignment process is not necessary and viewing angle dependence is small. In addition, since an alignment film does not need to be provided and rubbing treatment is unnecessary, electrostatic discharge caused by the rubbing treatment can be prevented and defects and damage of the display panel can be reduced in the manufacturing process. Thus, the productivity of the display panel can be increased.

The specific resistivity of the liquid crystal material is $1\times10^9$ Ω·cm or more, preferably $1\times10^{11}$ Ω·cm or more, further preferably $1\times10^{12}$ Ω·cm or more. The value of the specific resistivity in this specification is measured at 20° C.

For the display panel including the liquid crystal elements (the liquid crystal display panel), a twisted nematic (TN) mode, an in-plane-switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used.

The display panel in this embodiment can be a normally black liquid crystal display panel such as a transmissive liquid crystal display panel utilizing a vertical alignment (VA) mode. The vertical alignment mode is a method of controlling alignment of liquid crystal molecules of a liquid crystal display panel, in which liquid crystal molecules are aligned vertically to a panel surface when no voltage is applied. There are some examples of the vertical alignment mode, and for instance, a multi-domain vertical alignment (MVA) mode, a patterned vertical alignment (PVA) mode, or an advanced super view (ASV) mode can be employed. Moreover, it is possible to use a method called domain multiplication or multi-domain design, in which a pixel is divided into several regions (subpixels) and molecules are aligned in different directions in their respective regions.

In the display panel described in this embodiment, a black matrix (a light-shielding layer), an optical member (an optical substrate) such as a polarizing member, a retardation member, or an anti-reflection member, and the like are provided as appropriate. For example, circular polarization may be obtained by using a polarizing substrate and a retardation substrate. In addition, a backlight, a side light, or the like may be used as a light source for the liquid crystal display panel.

As a display method in the pixel portion, a progressive method, an interlace method, or the like can be employed. Further, color elements controlled in a pixel at the time of color display are not limited to three colors: R, G, and B (R, G, and B correspond to red, green, and blue). For example, R, G, B, and W (W corresponds to white); or R, G, B, and one or more of yellow, cyan, magenta, and the like can be used. Note that the size of display regions may be different between dots of color elements. This embodiment is not limited to the application to a display panel for color display but can also be applied to a display panel for monochrome display.

The display device according to one embodiment of the present invention can be provided by applying the display panel described in this embodiment to the display panel in Embodiment 1.

Note that this embodiment can be implemented in appropriate combination with the structures described in the other embodiments.

Embodiment 4

The display device according to one embodiment of the present invention may include a position input device called a touch panel. In this embodiment, a description is given using FIGS. 9A and 9B of an example of the structure of a shutter panel that is applicable to the display device in one embodiment of the present invention and includes a touch panel.

Figure 9A:
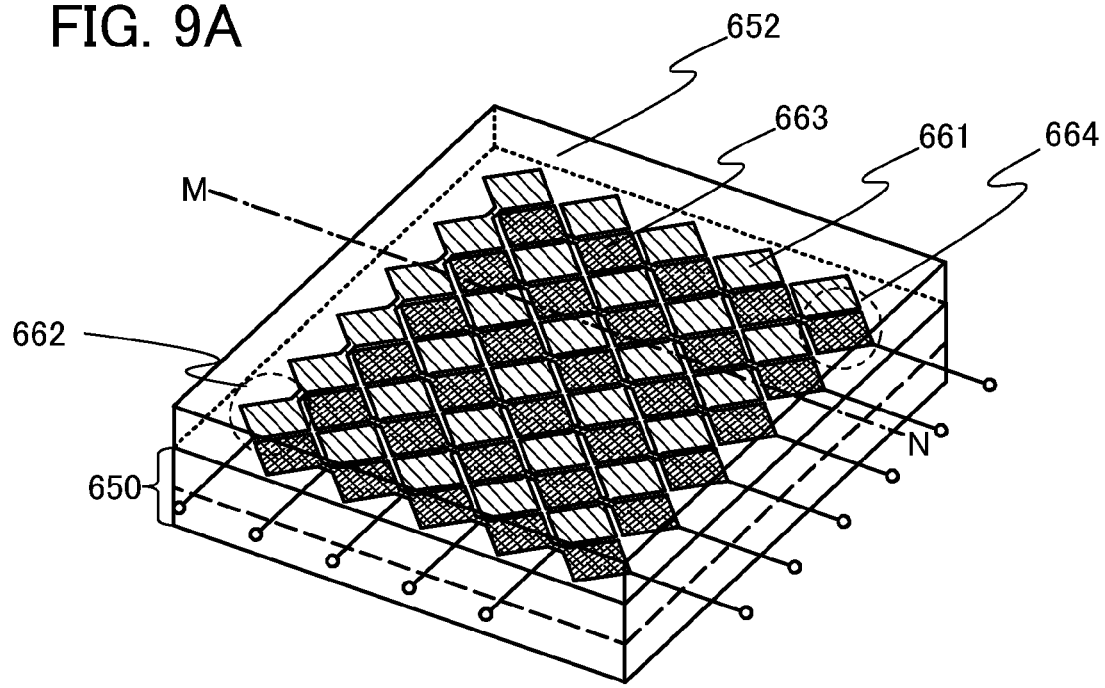
FIGS. 9A and 9B illustrate one embodiment of a shutter panel.
Figure 9B:
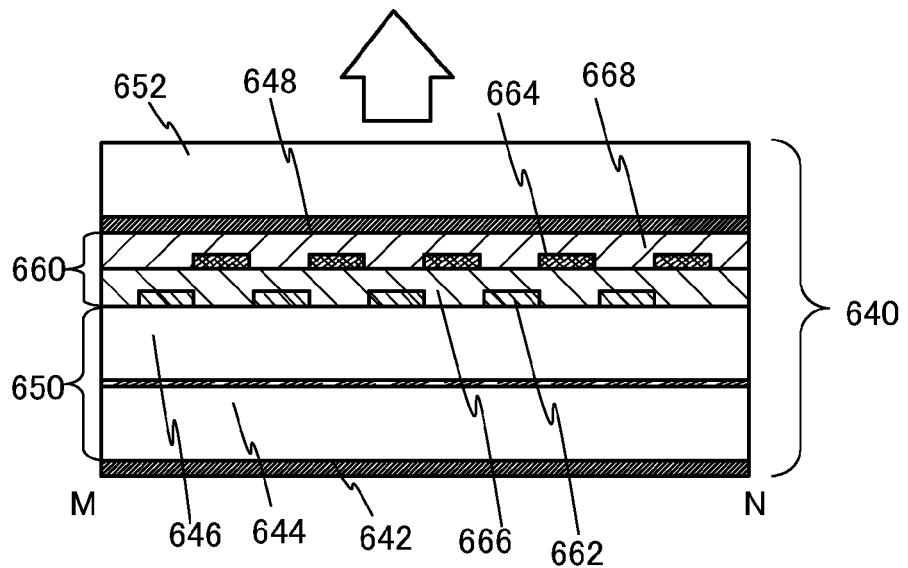

FIG. 9A is a perspective view of a shutter panel shown in this embodiment. FIG. 9B is a cross-sectional view along M-N in FIG. 9A. Note that in FIG. 9A, some of components (e.g., a polarizing plate) are omitted in order to avoid complexity of the drawing.

A shutter panel 640 illustrated in FIGS. 9A and 9B includes a first polarizing plate 642, a liquid crystal element unit 650, a touch panel unit 660 provided to overlap with the liquid crystal element unit 650, a second polarizing plate 648, and a substrate 652 provided in contact with the second polarizing plate 648.

The liquid crystal element unit 650 includes a plurality of liquid crystal elements provided between a substrate 644 and a substrate 646. The plurality of liquid crystal elements can have the structure shown in Embodiment 2.

An arrow in FIG. 9B indicates the direction of emitted light, which means that a display panel is provided on the first polarizing plate 642 side in the display device according to one embodiment of the present invention.

For the touch panel unit 660, the capacitive touch technology can be used, for example. FIGS. 9A and 9B show an example of the structure using a projected capacitive touch technology. The touch panel unit 660 includes a plurality of first electrodes 662, an insulating layer 666 covering the first electrodes 662, a plurality of second electrodes 664, and an insulating layer 668 covering the second electrodes 664.

The first electrode 662 has a structure where a plurality of rectangular conductive films 661 are connected to each other. The second electrode 664 has a structure where a plurality of rectangular conductive films 663 are connected to each other. The plurality of the first electrodes 662 and the plurality of the second electrodes 664 overlap with each other so that the positions of the rectangular conductive films 661 are different from those of the rectangular conductive films 663. Note that the shapes of the first electrodes 662 and the second electrodes 664 are not limited to the above.

The first electrode 662 and the second electrode 664 can be formed using a light-transmitting conductive material such as indium tin oxide containing silicon oxide, indium tin oxide, zinc oxide, indium zinc oxide, or zinc oxide to which gallium is added, for example.

One example of the shutter panel including the touch panel unit described in this embodiment has a structure in which the touch panel unit 660 is stacked between the first polarizing plate 642 and the second polarizing plate 648 which constitute the shutter panel. This structure can reduce the number of components as compared to the case where a shutter panel and a touch panel are manufactured separately and provided in a display device. As a result, manufacturing costs of the display device can be reduced. Moreover, the weight and thickness of the display device can be reduced.

Note that this embodiment can be implemented in appropriate combination with the structures described in the other embodiments.

Embodiment 5

The display device according to one embodiment of the present invention can be used for laptops and image reproducing devices provided with recording media (typically, devices that reproduce the content of recording media such as digital versatile discs (DVDs) and have displays for displaying the reproduced images). Other examples of electronic devices that can include the display device according to one embodiment of the present invention are mobile phones, portable game consoles, personal digital assistants, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), and vending machines. In this embodiment, specific examples of such electronic devices will be described with reference to FIGS. 10A to 10C.

Figure 10A:
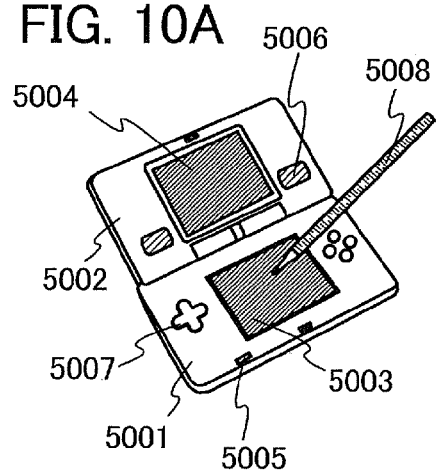
FIGS. 10A to 10C illustrate embodiments of electronic devices.

FIG. 10A illustrates a portable game console including a housing 5001, a housing 5002, a display portion 5003, a display portion 5004, a microphone 5005, speakers 5006, operation keys 5007, and a stylus 5008. The display device according to one embodiment of the present invention can be used as the display portion 5003 or the display portion 5004. By using the display device according to one embodiment of the present invention as the display portion 5003 or the display portion 5004, it is possible to provide a highly convenient portable game console capable of displaying 3D images. Although the portable game console in FIG. 10A has the two display portions 5003 and 5004, the number of display portions included in a portable game console is not limited to this.

Figure 10B:
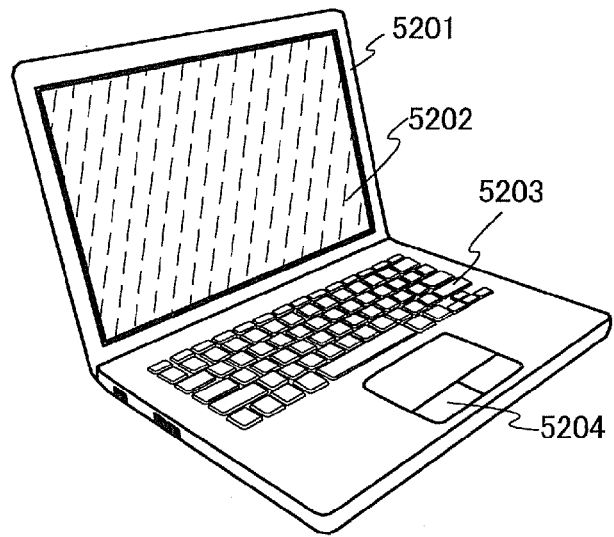

FIG. 10B illustrates a laptop personal computer including a housing 5201, a display portion 5202, a keyboard 5203, and a pointing device 5204. The display device according to one embodiment of the present invention can be used for the display portion 5202. By using the display device according to one embodiment of the present invention as the display portion 5202, it is possible to provide a highly convenient laptop personal computer capable of displaying 3D images.

Figure 10C:
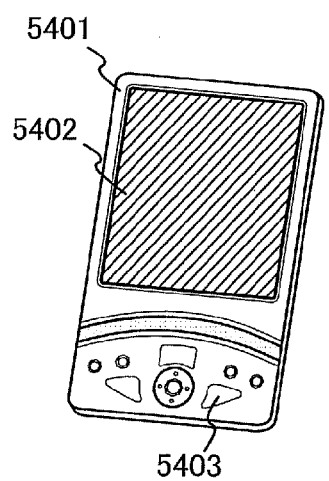

FIG. 10C illustrates a personal digital assistant including a housing 5401, a display portion 5402, and operation keys 5403. The display device according to one embodiment of the present invention can be used as the display portion 5402. By using the display device according to one embodiment of the present invention as the display portion 5402, it is possible to provide a highly convenient personal digital assistant capable of displaying 3D images.

This embodiment can be implemented in appropriate combination with the structures described in the other embodiments.

This application is based on Japanese Patent Application serial No. 2011-031154 filed with Japan Patent Office on Feb. 16, 2011, the entire contents of which are hereby incorporated by reference.

What is claimed is:

1. A display device comprising:
   a display panel comprising a plurality of pixel regions arranged in matrix, the pixel regions each comprising sub-pixels next to each other; and
   a shutter panel comprising a plurality of optical shutter regions arranged in matrix,
   wherein in a first three-dimensional display state, the display panel is configured to perform display regarding one pixel region as one display element unit,
   wherein in a second three-dimensional display state, the display panel is configured to perform display regarding at least two pixel regions next to each other as one display element unit,
   wherein light-transmitting and light-shielding states of the plurality of optical shutter regions in the first three-dimensional display state are different from light-transmitting and light-shielding states of the plurality of optical shutter regions in the second three-dimensional display state, and
   wherein the shutter panel is positioned in a direction of light emission from the display panel.

2. The display device according to claim 1,
   wherein at least one of the sub-pixels expresses black in the second three-dimensional display state.

3. The display device according to claim 1, further comprising a sensor configured to measure a distance between a viewer and the display device,
   wherein the light-transmitting and light-shielding states of the plurality of optical shutter regions are controlled in accordance with the distance measured by the sensor.

4. The display device according to claim 1,
   wherein the shutter panel comprises electrodes arranged in a stripe pattern, and
   wherein the electrodes have a different width.

5. The display device according to claim 1,
   wherein the shutter panel comprises a first polarizing plate, an optical element over the first polarizing plate, a second polarizing plate over the optical element, and a touch panel between the first polarizing plate and the second polarizing plate.

6. A display device comprising:
   a display panel comprising a first pixel region, a second pixel region, a third pixel region, and a fourth pixel region each comprising sub-pixels next to each other; and
   a shutter panel comprising a plurality of optical shutter regions arranged in matrix,
   wherein in a first three-dimensional display state, the plurality of optical shutter regions are configured to transmit light from the sub-pixels of the first pixel region and the sub-pixels of the third pixel region for one of right and left eyes, and the plurality of optical shutter regions are configured to transmit light from the sub-pixels of the second pixel region and the sub-pixels of the fourth pixel region for the other of the right and left eyes,
   wherein in a second three-dimensional display state, the plurality of optical shutter regions are configured to transmit light from the sub-pixels of the first pixel region and the sub-pixels of the second pixel region for the one of the right and left eyes, and the plurality of optical shutter regions are configured to transmit light from the sub-pixels of the third pixel region and the sub-pixels of the fourth pixel region for the other of the right and left eyes,
   wherein the first pixel region is next to the second pixel region, and a common image signal is supplied to the first pixel region and the second pixel region in the second three-dimensional display state,
   wherein the third pixel region is next to the fourth pixel region, and a common image signal is supplied to the third pixel region and the fourth pixel region in the second three-dimensional display state,
   wherein the third pixel region is positioned between the second pixel region and the fourth pixel region, and
   wherein the shutter panel is positioned in a direction of light emission from the display panel.

7. The display device according to claim 6,
   wherein at least one of the sub-pixels expresses black in the second three-dimensional display state.

8. The display device according to claim 6, further comprising a sensor configured to measure a distance between a viewer and the display device,
   wherein the light-transmitting and light-shielding states of the plurality of optical shutter regions are controlled in accordance with the distance measured by the sensor.

9. The display device according to claim 6,
   wherein the shutter panel comprises electrodes arranged in a stripe pattern, and
   wherein the electrodes have a different width.

10. The display device according to claim 6,
    wherein the shutter panel comprises a first polarizing plate, an optical element over the first polarizing plate, a second polarizing plate over the optical element, and a touch panel between the first polarizing plate and the second polarizing plate.

11. A method for driving a display device comprising a display panel and a shutter panel, comprising the steps of:
    supplying image signals for one of right and left eyes to sub-pixels of a first pixel region and sub-pixels of a third pixel region of the display panel in a first three-dimensional display state;
    supplying image signals for the other of the right and left eyes to sub-pixels of a second pixel region and sub-pixels of a fourth pixel region of the display panel in the first three-dimensional display state;
    supplying a common image signal for the one of the right and left eyes to the sub-pixels of the first pixel region and the sub-pixels of the second pixel region in a second three-dimensional display state;
    supplying a common image signal for the other of the right and left eyes to the sub-pixels of the third pixel region and the sub-pixels of the fourth pixel region in the second three-dimensional display state; and
    controlling light-transmitting and light-shielding states of a plurality of optical shutter regions of the shutter panel,
    wherein the light-transmitting and light-shielding states of the plurality of optical shutter regions in the first three-dimensional display state are different from the light-transmitting and light-shielding states of the plurality of optical shutter regions in the second three-dimensional display state, wherein the sub-pixels of the first pixel region are next to each other, wherein the sub-pixels of the second pixel region are next to each other, wherein the first pixel region is next to the second pixel region, and the third pixel region is next to the fourth pixel region, and wherein the third pixel region is positioned between the second pixel region and the fourth pixel region.

12. The method for driving the display device according to claim 11, further comprising the step of:

measuring a distance between a viewer and the display device by a sensor, wherein the light-transmitting and light-shielding states of the plurality of optical shutter regions are controlled in accordance with the distance.

13. The method for driving the display device according to claim 11, wherein the shutter panel comprises electrodes arranged in a stripe pattern, and wherein the electrodes have a different width.

14. The method for driving the display device according to claim 11, wherein the shutter panel comprises a first polarizing plate, an optical element over the first polarizing plate, a second polarizing plate over the optical element, and a touch panel between the first polarizing plate and the second polarizing plate.

\* \* \* \* \*